(No Model.)

W. W. GRISCOM.
Regulating Electro-Magnetic Motors.

No. 228,888. Patented June 15, 1880.

Attests.
James F. Tobin
Henry Howson Jr.

Inventor:
William W. Griscom
by his Attorneys
Howson and Son

UNITED STATES PATENT OFFICE.

WILLIAM W. GRISCOM, OF PHILADELPHIA, PENNSYLVANIA.

REGULATING ELECTRO-MAGNETIC MOTORS.

SPECIFICATION forming part of Letters Patent No. 228,888, dated June 15, 1880.

Application filed March 29, 1880. (No model.)

*To all whom it may concern:*

Be it known that I, WILLIAM W. GRISCOM, a citizen of the United States, residing in Philadelphia, Pennsylvania, have invented an Improvement in Regulating Electro-Magnetic Motors, of which the following is a specification.

This invention relates to the regulation of the speed of electro-magnetic motors, the object of the invention being to obtain a delicate regulation of the motor without waste of the electric current. This object I attain by combining with the motor and battery or generator devices controlled by a treadle for regulating the extent of immersion of anodes and cathodes in their liquid.

Figure 1:
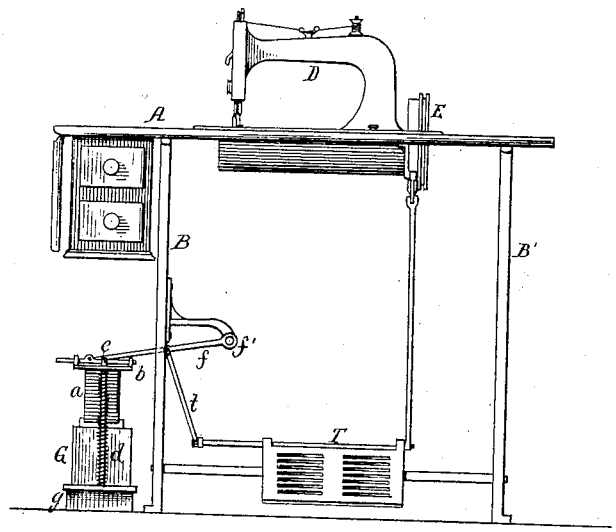
Figure 2:
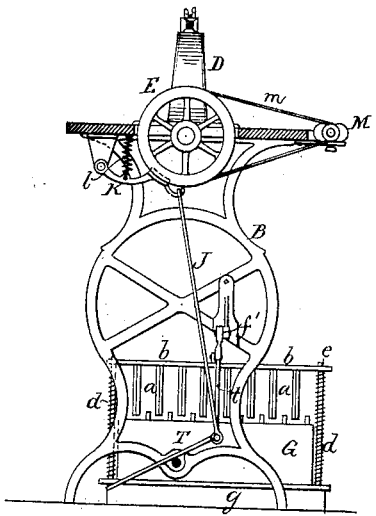

In the accompanying drawings the improvements are shown as applied to an ordinary sewing-machine, Figure 1 being a front view of the machine with the improvements applied thereto; Fig. 2, a vertical section, and Fig. 3 a view of a modification.

Referring to Figs. 1 and 2, the table A of the machine is supported on the usual end frames, B B', and carries a sewing-machine, D, the detailed construction of which it has not been deemed necessary to illustrate. On the driving-shaft of the machine is the usual pulley E, over which passes a belt, $m$, from the shaft of the electro-magnetic motor M. This motor may be of any desired construction, and is shown in the drawings as supported on a bracket on the rear edge of the table; but it will be evident that it may be arranged in any position in relation to the sewing-machine that convenience in transmitting the power may suggest.

The battery G, from which the motor derives its power, is supported on a platform, $g$, preferably at one side of the machine, as shown in Fig. 2, this battery consisting of a number of cells, into which dip the battery-plates $a$. These plates are carried by a horizontal bar or plate, $b$, which is supported by spiral springs $d$ on vertical guide-rods $e$. To the top of this plate $b$ is connected, through a sliding bolt or other means, an arm or lever, $f$, hinged at $f'$ to some fixed part of the frame, and to this arm is connected a rod, chain, or cord, $t$, also connected to a projecting pin on the treadle T, which may be similar to those used on sewing-machines, but which, in the present instance, has no connection with any fly-wheel or crank, as is usual.

By depressing the treadle the lever $f$ will be caused to depress the bar $b$, carrying the battery-plates against the action of the springs $d$, so as to depress the said plates into the exciting-liquid in the cells, and thus generate an electric current, which sets the motor in operation. By depressing the plates farther into the liquid in the cells the strength of the current, and consequently the speed of the motor, will be proportionately increased. In the same manner, by removing the pressure from the treadle and allowing the springs $d$ to raise the plates in the cells, the power of the current, and consequent speed of the motor, will be diminished until the plates are entirely withdrawn from contact with the liquid, when the operation of the motor will cease.

It will be seen that by this method of regulating the motor a great economy in battery-power is obtained, since the plates are only immersed to the exact depth requisite to give the desired speed.

In order to permit the delicate regulation and quick stoppage of the machine when desired, a brake-lever, K, operated by a spring, $t$, is arranged to act on the driving-wheel E. To this lever is pivoted a rod, J, connected to the treadle T, so that when the battery-plates are depressed into the cells to start the motor the brake-lever will at the same time be withdrawn from contact with the wheel, and on the other hand, as the battery-plates are withdrawn from the cells, the brake, acted on by the spring $t$, will be applied to the wheel.

It will be evident that the particular construction, position, and arrangement of devices for dipping the battery-plates into and withdrawing them from the cells and for operating the brake may be modified without departing from the invention. For instance, the brake-lever may be applied under the direct action of the treadle while the spring is employed to withdraw it, and in the same manner the devices for moving the battery-plates may be changed.

The battery and its attachments, instead of being placed in the position shown, may be arranged on a shelf beneath the table, or in any other position which may be found convenient.

Figure 3:
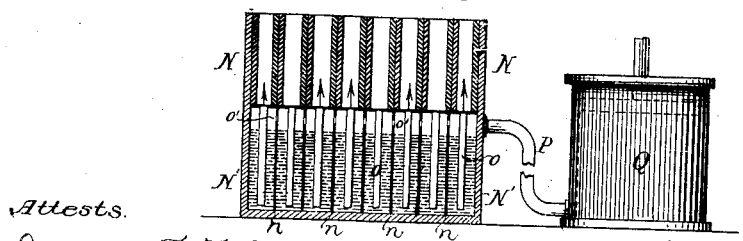

The plates of the battery may be fixed and the cells movable and connected to operating devices controlled by a treadle, by which the cells may be raised or lowered, and the plates thereby immersed to a greater or less extent in the exciting-fluid; or the plates and cells may be fixed, and the fluid itself caused to submerge the plates or to subside at pleasure, by means of a pump or diaphragm, or other device under the control of the operator. In Fig. 3, for instance, are illustrated devices for causing the liquid to enter or leave the cells of a battery for the purpose of regulating the speed of the motor.

Below the battery N, which is provided with the desired number of cells, is arranged a closed chamber, N', of somewhat larger capacity than the battery, and divided by partitions n into as many compartments as there are cells. Each compartment communicates with its corresponding battery-cell through a tube, o, which extends nearly to the bottom of the compartment. These compartments are in communication with each other through a series of openings, o', near the top of the chamber N', which is in communication, through a pipe, P, with a cylinder, Q, provided with a solid piston. The piston-rod of this piston may be provided with a system of levers, under the control of the operator of the machine, to be driven by the motor.

Suppose the chamber N' to be supplied with the exciting-liquid, as indicated in the drawings, and the piston to be at the top of its stroke. When the operator forces down the piston, the liquid, under the pressure of air, will be forced up into the cells of the battery through the tubes o to a height corresponding with the depression of the piston. When the piston is withdrawn the liquid will flow back into the compartments of the chamber N'. It will be seen that by this means the strength of the current and the speed of the motor can be regulated in the same way as by moving the plates or the battery.

The cells of the battery may be constructed in any usual manner. In the drawings I have shown them as constructed in the manner described in Letters Patent No. 207,270, August 20, 1878, the divisions between the cells being formed by the battery-plates, and the zinc element of one cell being soldered or otherwise directly secured to the carbon element of the adjoining cell.

It will also be evident that these improvements in regulators for electric motors may be applied to the driving of many different machines, a sewing-machine being referred to in the present instance as an example of the general applicability of the invention.

I claim—

1. The combination of a cell or group of cells containing the liquid, positive and negative plates, and a lever connected thereto for regulating their immersion, with devices for automatically removing the plates from the liquid when the said lever is released, all substantially as set forth.

2. An electro-magnetic motor, positive and negative plates, devices for immersing the plates in and for automatically removing them from the liquid, in combination with braking mechanism constructed to act in conjunction with the automatic device for raising the plates, substantially as specified.

In testimony whereof I have signed my name to this specification in the presence of two subscribing witnesses.

WM. W. GRISCOM.

Witnesses:
HUBERT HOWSON,
HARRY SMITH.